US008846774B2

(12) United States Patent
Jintoku et al.

(10) Patent No.: US 8,846,774 B2
(45) Date of Patent: Sep. 30, 2014

(54) RESIN COMPOSITION FOR POLYOLEFIN RESIN FOAM, POLYOLEFIN RESIN FOAM AND FOAMED SEALING MATERIAL

(75) Inventors: Naomi Jintoku, Osaka (JP); Itsuhiro Hatanaka, Osaka (JP); Tetsurou Kobayashi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 13/560,399

(22) Filed: Jul. 27, 2012

(65) Prior Publication Data
US 2013/0079430 A1 Mar. 28, 2013

(30) Foreign Application Priority Data

Jul. 29, 2011 (JP) ................................. 2011-167427
Apr. 27, 2012 (JP) ................................. 2012-103118

(51) Int. Cl.
*C08F 8/00* (2006.01)
*C08L 23/00* (2006.01)
*C08L 21/00* (2006.01)
*C08L 23/12* (2006.01)
*C08J 9/00* (2006.01)
*C08J 9/12* (2006.01)
*B32B 27/32* (2006.01)
*B32B 5/18* (2006.01)
*C09K 3/10* (2006.01)
*C08J 9/08* (2006.01)
*C08L 23/10* (2006.01)
*C08L 23/04* (2006.01)
*C08L 23/02* (2006.01)
*C08L 23/16* (2006.01)

(52) U.S. Cl.
CPC ................. *C08L 23/12* (2013.01); *C08L 23/10* (2013.01); *C08L 23/00* (2013.01); *C08L 21/00* (2013.01); *C08J 2323/16* (2013.01); *C08J 2491/00* (2013.01); *C09K 2200/0208* (2013.01); *C08J 9/0061* (2013.01); *C09K 2200/0617* (2013.01); *C08L 23/04* (2013.01); *C08J 9/12* (2013.01); *C08L 2205/02* (2013.01); *B32B 27/32* (2013.01); *C08L 23/02* (2013.01); *B32B 5/18* (2013.01); *C08L 23/16* (2013.01); *C08J 2205/04* (2013.01); *C09K 2200/0239* (2013.01); *C08J 2203/08* (2013.01); *C08J 9/122* (2013.01); *C09K 3/10* (2013.01); *C08J 2201/032* (2013.01); *C08L 2205/025* (2013.01); *C08J 9/08* (2013.01); *C08J 2323/12* (2013.01)
USPC ............................ 521/134; 525/240; 524/528

(58) Field of Classification Search
CPC ................................. C08J 9/0061; C08J 9/12
USPC ............................ 521/134; 525/240; 524/528
See application file for complete search history.

(56) References Cited

U.S. PATENT DOCUMENTS 4,323,528 A * 4/1982 Collins ........................... 264/53
6,417,242 B1 * 7/2002 Hughes et al. ................ 521/142
(Continued)

FOREIGN PATENT DOCUMENTS

EP 1113062 A1 * 7/2001
JP 2001348452 A 12/2001
(Continued)

OTHER PUBLICATIONS

Dharia, A.; Folland, R. "Properties and applications of blends of High Melt Strength PP And linear PP" Annual Technical Conference—Society of Plastics Engineers. 2005. pp. 2156-2162.*

(Continued)

*Primary Examiner* — Randy Gulakowski
*Assistant Examiner* — Christina Wales
(74) *Attorney, Agent, or Firm* — Sughrue Mion PLLC

(57) ABSTRACT

The present invention relates to a resin composition for a polyolefin resin foam, including: a polyolefin (A) having a melt flow rate (MFR) at a temperature of 230° C. of 0.2 to 0.7 g/10 min and a melt tension at break measured at a temperature of 190° C. of 30 cN or more; and a polyolefin (B) having a melt flow rate (MFR) at a temperature of 230° C. of 1.5 to 10 g/10 min and a melt tension at break measured at a temperature of 190° C. of 10 cN or more, in which the polyolefin (B) is contained in an amount of from 15 to 75 parts by weight based on 100 parts by weight of the polyolefin (A).

10 Claims, 1 Drawing Sheet

(56) References Cited

U.S. PATENT DOCUMENTS

| | | |
|---|---|---|
| 2004/0162358 A1 | 8/2004 | Yamamoto et al. |
| 2007/0293630 A1* | 12/2007 | Dharia et al. ............... 525/240 |
| 2008/0058437 A1* | 3/2008 | Burgun et al. ............... 521/140 |
| 2009/0209670 A1 | 8/2009 | Kanae et al. |

FOREIGN PATENT DOCUMENTS

| | | |
|---|---|---|
| JP | 200247326 A | 2/2002 |
| JP | 4486941 B2 | 6/2010 |
| JP | 2010270228 A | 12/2010 |

OTHER PUBLICATIONS

DeMaio, V.V.; Dong, D. "The Effect of Chain Structure on Melt Strength of Polypropylene and Polyethylene" ANTEC 1997 Plastics: Plastics Saving Planet Earth, vol. 2: Materials. (1997). Society of Plastics Engineers. Online version available at: http://www.knovel.com/web/portal/browse/display?_EXT_KNOVEL_DISPLAY_bookid=764&VerticalID=0.*

* cited by examiner

RESIN COMPOSITION FOR POLYOLEFIN RESIN FOAM, POLYOLEFIN RESIN FOAM AND FOAMED SEALING MATERIAL

FIELD OF THE INVENTION

The present invention relates to a resin composition for a polyolefin resin foam, a polyolefin resin foam formed by foaming the resin composition and a foamed sealing material including the polyolefin resin foam.

BACKGROUND OF THE INVENTION

Foams have been used as sealing materials or buffer materials for electronic devices, including buffer materials for transportation, thermal insulating materials, packaging materials and building materials. In recent years, with miniaturization of electronic devices and an increase in size of screens, the area of the foams used as sealing materials or buffer materials decreases. It is therefore required for the foams to exhibit sufficient sealing ability or buffering ability even though they have a small area. In order to exhibit the sufficient ability despite the small area, methods for miniaturizing cells have been performed (Patent Documents 1 to 3).

However, in Patent Document 1 or 2 described above, the foam having uniform microcells are formed, but sufficient flexibility is not obtained because of its low expansion ratio. There is a possibility that this causes deterioration of buffering ability or screen unevenness of electronic devices. Further, sufficient flexibility may not be obtained, because the foamed structure is a closed cell structure. In Patent Document 3, the foam excellent in flexibility and having microcells is formed at a low discharge speed. However, when the discharge speed in producing the foam is high, the expansion ratio may be decreased, or the cells may become uneven. When the cells become uneven, the sealing ability or buffering ability may be deteriorated in the case where the foam having a small area is used.

That is to say, when the discharge speed is increased to produce the foam at a high production speed, no foam has been obtained at present, which has uniform microcells while maintaining a sufficient expansion ratio and flexibility, and does not lose sealing ability or buffering ability even in the case where the foam having a small area is used.

Patent Document 1: JP-A-2002-47326
Patent Document 2: Japanese Patent No. 4486941
Patent Document 3: JP-A-2010-270228

SUMMARY OF THE INVENTION

It is therefore an object of the invention to provide a resin composition for a polyolefin resin foam, which can form a polyolefin resin foam having uniform microcells while maintaining a sufficient expansion ratio and flexibility, even when the discharge speed is high. Further, another object of the invention is to provide a polyolefin resin foam having uniform microcells while maintaining a sufficient expansion ratio and flexibility.

In order to achieve the above-mentioned objects, the present inventors have made intensive studies. As a result, it has been found that a resin composition for a polyolefin resin foam, which can form a polyolefin resin foam having uniform microcells while maintaining a sufficient expansion ratio and flexibility, even when the discharge speed is high, is obtained by allowing a polyolefin (A) having a specific melt flow rate (MFR) and a specific melt tension at break and a polyolefin (B) having a specific melt flow rate (MFR) and a specific melt tension at break to be contained in specific proportions.

Namely, the present invention relates to the following items (1) to (11).

(1) A resin composition for a polyolefin resin foam, including:

a polyolefin (A) having a melt flow rate (MFR) at a temperature of 230° C. of 0.2 to 0.7 g/10 min and a melt tension at break measured at a temperature of 190° C. of 30 cN or more; and a polyolefin (B) having a melt flow rate (MFR) at a temperature of 230° C. of 1.5 to 10 g/10 min and a melt tension at break measured at a temperature of 190° C. of 10 cN or more, in which the polyolefin (B) is contained in an amount of from 15 to 75 parts by weight based on 100 parts by weight of the polyolefin (A).

(2) The resin composition for a polyolefin resin foam according to item (1), further including a component (C) which includes at least one selected from the group consisting of a rubber and a thermoplastic elastomer and a softener and has a melt flow rate (MFR) at a temperature of 230° C. of 3 to 10 g/10 min and a melt tension at break measured at a temperature of 190° C. of less than 10 cN, in which the component (C) is contained in an amount of from 30 to 200 parts by weight based on 100 parts by weight of the polyolefin (A).

(3) A polyolefin resin foam formed by foaming the resin composition for a polyolefin resin foam according to item (1) or (2).

(4) The polyolefin resin foam according to item (3), having an apparent density of 0.01 to 0.15 g/cm³.

(5) The polyolefin resin foam according to item (3) or (4), having an average cell diameter of 10 to 200 µm.

(6) The polyolefin resin foam according to any one of items (3) to (5), which is formed by impregnating the resin composition for a polyolefin resin foam with an inert gas under a pressure of 5 MPa or more, followed by foaming.

(7) The polyolefin resin foam according to item (6), in which the inert gas is carbon dioxide.

(8) The polyolefin resin foam according to item (6) or (7), in which the inert gas at the time of impregnation is in a supercritical state.

(9) The polyolefin resin foam according to any one of items (3) to (8), having a semi-interconnected semi-closed cell structure.

(10) A foamed sealing material including the polyolefin resin foam according to any one of items (3) to (9).

(11) The foamed sealing material according to item (10), further including a pressure-sensitive adhesive layer.

The resin composition for a polyolefin resin foam of the invention has the above-mentioned constitution, so that the polyolefin resin foam having uniform microcells can be prepared while maintaining a sufficient expansion ratio and flexibility, even when the discharge speed is high. For this reason, the production speed and production efficiency in producing the polyolefin resin foam are improved. Further, the polyolefin resin foam of the invention formed from the resin composition for a polyolefin resin foam of the invention has uniform microcells, so that even in the case where the foam having a small area is used, excellent sealing ability or buffering ability can be exhibited.

DETAILED DESCRIPTION OF THE INVENTION

[Resin Composition for Polyolefin Resin Foam]

Figure 1:
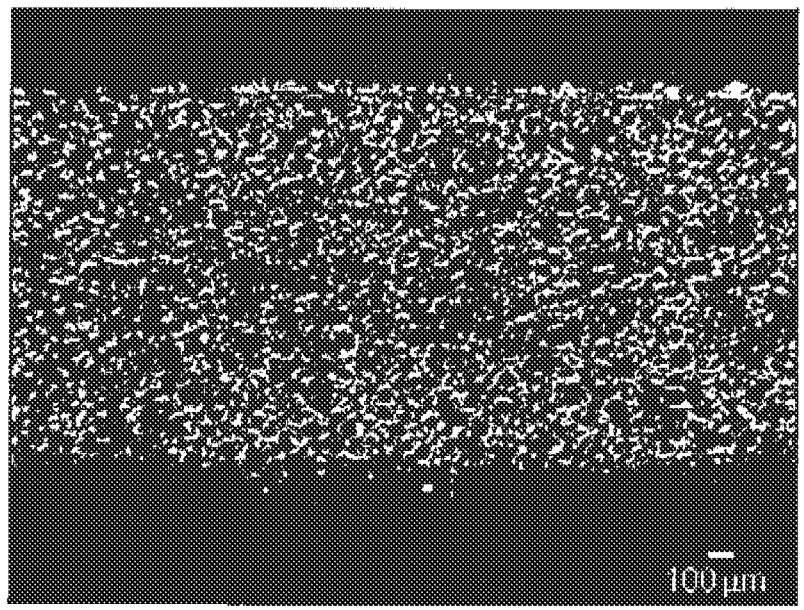
FIG. 1 is a digital microscope photograph showing a cross section in a thickness direction of a polyolefin resin foam of Example 1.

The resin composition for a polyolefin resin foam of the invention includes at least a polyolefin (A) having a melt flow rate (MFR) at a temperature of 230° C. of 0.2 to 0.7 g/10 min and a melt tension at break measured at a temperature of 190° C. of 30 cN or more and a polyolefin (B) having a melt flow rate (MFR) at a temperature of 230° C. of 1.5 to 10 g/10 min and a melt tension at break measured at a temperature of 190° C. of 10 cN or more. It is preferred that a component (C) containing a rubber and/or a thermoplastic elastomer and a softener and having a melt flow rate (MFR) at a temperature of 230° C. of 3 to 10 g/10 min and a melt tension at break measured at a temperature of 190° C. of less than 10 cN is further contained. Furthermore, other additives may be contained as needed.

Incidentally, in this specification, "the resin composition for a polyolefin resin foam of the invention" may be referred to as "the resin composition of the invention". Further, "a polyolefin (A) having a melt flow rate (MFR) at a temperature of 230° C. of 0.2 to 0.7 g/10 min and a melt tension at break measured at a temperature of 190° C. of 30 cN or more" may be referred to as "polyolefin (A)". Furthermore, "a polyolefin (B) having a melt flow rate (MFR) at a temperature of 230° C. of 1.5 to 10 g/10 min and a melt tension at break measured at a temperature of 190° C. of 10 cN or more" may be referred to as "polyolefin (B)". In addition, "a component (C) containing a rubber and/or a thermoplastic elastomer and a softener and having a melt flow rate (MFR) at a temperature of 230° C. of 3 to 10 g/10 min and a melt tension at break measured at a temperature of 190° C. of less than 10 cN" may be referred to as "component (C)". Further, "a melt flow rate (MFR) at a temperature of 230° C." may be referred to as "a MFR (230° C.)". Furthermore, "a melt tension at break measured at a temperature of 190° C." may be referred to as "a melt tension (190° C., at break)".

Each of polyolefin (A), polyolefin (B), component (C) and the other additives may be used either alone or in combination of two or more kinds thereof.

(Polyolefin (A))

Polyolefin (A) described above is not specifically limited, and is, for example, a polymer including (being formed from) an α-olefin as an essential component, namely a polymer having at least a constituent unit derived from an α-olefin in one molecule thereof. Polyolefin (A) described above may be, for example, either a polymer composed of an α-olefin or a polymer comprising an α-olefin and a monomer component other than the α-olefin.

Polyolefin (A) described above may be either a homopolymer or a copolymer containing two or more kinds of monomers. Further, in the case of the copolymer, polymer (A) may be a random copolymer or a block copolymer. Polyolefin (A) described above may be one kind of polymer or in combination of two or more kinds of polymers.

Although not specifically limited, polyolefin (A) described above is preferably a straight-chain polyolefin, from the viewpoint of obtaining the polyolefin resin foam having a high expansion ratio.

As the above-mentioned α-olefin, preferred is, for example, an α-olefin having 2 to 8 carbon atoms (for example, ethylene, propylene, butene-1, pentene-1, hexene-1, 4-methyl-pentene-1, heptene-1, octene-1 or the like). The α-olefins may be used either alone or in combination of two or more kinds thereof.

The monomer components other than the above-mentioned α-olefin include, for example, ethylenic unsaturated monomers such as vinyl acetate, acrylic acid, acrylic ester, methacrylic acid, methacrylic ester and vinyl alcohol. The monomer components other than the α-olefin may be used either alone or in combination of two or more kinds thereof.

Polyolefin (A) described above includes, for example, low-density polyethylene, middle-density polyethylene, high-density polyethylene, linear low-density polyethylene, polypropylene (propylene homopolymer), a copolymer of ethylene with propylene, a copolymer of ethylene with an α-olefin other than ethylene, a copolymer of propylene with an α-olefin other than propylene, a copolymer of ethylene and propylene with an α-olefin other than ethylene and propylene, a copolymer of propylene with an ethylenic unsaturated monomer, and the like.

Polyolefin (A) described above is preferably a polymer including propylene as an essential monomer component (propylene-based polymer), namely a polymer having at least a constituent unit derived from propylene, from the viewpoint of heat resistance. That is to say, polyolefin (A) includes the propylene-based polymer such as polypropylene (propylene homopolymer), a copolymer of ethylene with propylene or a copolymer of propylene with an α-olefin other than propylene. The above-mentioned α-olefins other than propylene may be used either alone or in combination of two or more kinds thereof.

Although not specifically limited, the content of the above-mentioned α-olefin is, for example, preferably from 0.1 to 10% by weight, and more preferably from 1 to 5% by weight, based on the total amount (100% by weight) of the monomer components constituting polyolefin (A).

The melt flow rate (MFR, melt mass flow rate) at a temperature of 230° C. of polyolefin (A) described above is form 0.2 to 0.7 g/10 min, and preferably from 0.3 to 0.6 g/10 min. By adjusting the MFR (230° C.) to 0.2 g/10 min or more, extrusion can be smoothly performed. Further, by adjusting the MFR (230° C.) to 0.7 g/10 min or less, formability of the resin composition of the invention is improved. Incidentally, the MFR (230° C.) in this specification is understood to be the MFR measured at a temperature of 230° C. and a load of 2.16 kgf based on ISO 1133 (JIS K 7210).

The melt tension at break measured at a temperature of 190° C. of polyolefin (A) described above is 30 cN or more. Above all, it is preferably from 30 to 70 cN, and more preferably from 40 to 60 cN. By adjusting the melt tension (190° C., at break) to 70 cN or less, the expansion ratio is increased. Accordingly, the polyolefin resin foam formed by foaming can be made thick to further improve flexibility. By adjusting the melt tension (190° C., at break) to 30 cN or more, gas (foaming agent) leakage is inhibited at the time of cell formation to obtain the sufficient expansion ratio. Incidentally, the melt tension (190° C., at break) in this specification is measured by the following method.

(Measuring Conditions of Melt Tension (190° C., at Break))

The melt tension (190° C., at break) can be measured as the melt tension (cN) at break, for example, by filling a measurement sample into a capillary rheometer set to a temperature of 190° C., extruding it at a constant extrusion rate to obtain a sample, which is taken up on a roll through a tension detecting pulley, and gradually increasing the take-off speed (take-up speed) of the sample until breakage thereof.

Specifically, the measurement can be made by a method described in "(1) Melt Tension (190° C., at Break)" of (Evaluations) described later.

As polyolefin (A) described above, a commercial product may be used. Examples thereof include "E110G" (manufactured by Prime Polymer Co., Ltd.), "EA9" (manufactured by Japan Polypropylene Corporation), "EA9FT" (manufactured by Japan Polypropylene Corporation), "E-185G" (manufactured by Prime Polymer Co., Ltd.) and the like.

(Polyolefin (B))

Polyolefin (B) described above is not specifically limited, and is, for example, a polymer including an α-olefin as an essential component, namely a polymer having at least a constituent unit derived from an α-olefin in one molecule thereof. Polyolefin (B) described above may be, for example, either a polymer composed of an α-olefin or a polymer including an α-olefin and a monomer component other than the α-olefin.

Polyolefin (B) described above may be either a homopolymer or a copolymer containing two or more kinds of monomers. Further, in the case of the copolymer, polymer (B) may be a random copolymer or a block copolymer. Polyolefin (B) described above may be one kind of polymer or in combination of two or more kinds of polymers.

Although not specifically limited, polyolefin (B) described above is preferably a polyolefin in branched chain form (having a branched chain), because cell bloat or cell breakage (cell defoaming) is hard to occur after cell formation, and therefore, the polyolefin resin foam having uniform cells is obtained.

As the above-mentioned α-olefin, preferred is, for example, an α-olefin having 2 to 8 carbon atoms (for example, ethylene, propylene, butene-1, pentene-1, hexene-1,4-methyl-pentene-1, heptene-1, octene-1 or the like). The α-olefins may be used either alone or in combination of two or more kinds thereof.

The monomer components other than the above-mentioned α-olefin include, for example, ethylenic unsaturated monomers such as vinyl acetate, acrylic acid, acrylic ester, methacrylic acid, methacrylic ester and vinyl alcohol. The monomer components other than the α-olefin may be used either alone or in combination of two or more kinds thereof.

Polyolefin (B) described above includes, for example, low-density polyethylene, middle-density polyethylene, high-density polyethylene, linear low-density polyethylene, polypropylene (propylene homopolymer), a copolymer of ethylene with propylene, a copolymer of ethylene with another α-olefin, a copolymer of propylene with another α-olefin, a copolymer of ethylene and propylene with another α-olefin, a copolymer of propylene with another ethylenic unsaturated monomer, and the like.

Polyolefin (B) described above is preferably a polymer including propylene as an essential monomer component (propylene-based polymer), namely a polymer having at least a constituent unit derived from propylene, from the viewpoint of heat resistance. That is to say, polyolefin (B) includes the propylene-based polymer such as polypropylene (propylene homopolymer), a copolymer of ethylene with propylene or a copolymer of propylene with an α-olefin other than propylene. The above-mentioned α-olefins other than propylene may be used either alone or in combination of two or more kinds thereof.

Although not specifically limited, the content of the above-mentioned α-olefin is, for example, preferably from 5 to 50% by weight, and more preferably from 10 to 40% by weight, based on the total amount (100% by weight) of the monomer components constituting polyolefin (B).

The melt flow rate (MFR) at a temperature of 230° C. of polyolefin (B) described above is form 1.5 to 10 g/10 min, preferably from 1.5 to 3 g/10 min, and more preferably from 2.0 to 2.5 g/10 min. By adjusting the MFR (230° C.) to 1.5 g/10 min or more, the variations in cell diameter become hard to occur after cell structure formation, thereby being able to obtain the polyolefin resin foam having uniform cells. Further, by adjusting the MFR (230° C.) to 10 g/10 min or less, the resin does not drip down at the time of extrusion, and is excellent in processability of the polyolefin resin foam.

The melt tension at break measured at a temperature of 190° C. of polyolefin (B) described above is 10 cN or more, preferably from 10 to 70 cN, and more preferably from 13 to 60 cN. When the melt tension (190° C., at break) is 70 cN or less, the variations in cell diameter can be inhibited. Further, when the melt tension (190° C., at break) is 10 cN or more, the resin composition has extensibility, and molecules are entangled with one another to increase the viscosity thereof. Accordingly, cell bloat or cell breakage (cell deforming) becomes hard to occur after cell formation, thereby being able to inhibit the variations in cell diameter.

As polyolefin (B) described above, a commercial product may be used. Examples thereof include "WB140HMS" (manufactured by Borealis Corporation), "WB135HMS" (manufactured by Borealis Corporation) and the like.

(Component (C))

The above-mentioned component (C) is a mixture (composition) containing a rubber and/or a thermoplastic elastomer and a softener. The above-mentioned component (C) may contain an additive, as needed. That is to say, examples of the above-mentioned component (C) include a mixture containing a rubber, a thermoplastic elastomer and a softener, a mixture containing a rubber and a softener, and a mixture containing a thermoplastic elastomer and a softener. As the above-mentioned component (C), preferred is, for example, a mixture (composition) composed of a rubber and/or a thermoplastic elastomer and a softener, a mixture (composition) composed of a rubber and/or a thermoplastic elastomer, a softener and an additive (for example, carbon black) in the component (C), or the like. The above-mentioned rubber or thermoplastic elastomer is not specifically limited, as long as it is capable of being foamed, and a well-known rubber or thermoplastic elastomer can be used.

Although not specifically limited, the above-mentioned rubbers include, for example, natural or synthetic rubbers such as natural rubber, polyisobutylene, isoprene rubber, chloroprene rubber, butyl rubber and nitrile-butyl rubber. The above-mentioned rubbers may be used either alone or in combination of two or more kinds thereof.

Although not specifically limited, the above-mentioned thermoplastic elastomers include, for example, thermoplastic olefin-based elastomers such as ethylene-propylene copolymer, ethylene-propylene-diene copolymer, ethylene-vinyl acetate copolymer, polybutene, polyisobutylene and chlorinated polyethylene; thermoplastic styrenic elastomers such as styrene-butadiene-styrene copolymer, styrene-isoprene-styrene copolymer, styrene-isoprene-butadiene-styrene copolymer and hydrogenated polymers thereof thermoplastic polyester-based elastomers; thermoplastic polyurethane-based elastomers; thermoplastic acrylic elastomers; and the like. The above-mentioned thermoplastic elastomers may be used either alone or in combination of two or more kinds thereof.

As "a rubber and/or a thermoplastic elastomer" used in component (C), preferred is an olefin-based elastomer, and especially preferred is a thermoplastic olefin-based elastomer. Although not specifically limited, the thermoplastic olefin-based elastomer is an elastomer having a micro-phase separation structure of an polyolefin component and an olefin-based rubber component, and well compatible with polyolefin (A) and polyolefin (B). More specifically, as the thermoplastic olefin-based elastomer, there is preferably exemplified an elastomer including polypropylene resin (PP) and ethylene-propylene rubber (EPM) or ethylene-propylene-diene rubber (EPDM). Incidentally, from the viewpoint of compatibility, the mass ratio of the above-mentioned polyolefin component/olefin-based rubber component is preferably from 90/10 to 10/90, and more preferably from 80/20 to 20/80.

As the above-mentioned softener, there can be suitably used a softener commonly used in rubber products. Processability and flexibility can be improved by allowing the above-mentioned softener to be contained.

Specific examples of the above-mentioned softeners include petroleum oil substances such as process oil, lubricating oil, paraffin oil, liquid paraffin oil, petroleum asphalt and vaseline; coal tars such as coal tar and coal tar pitch; fatty oils such as castor oil, linseed oil, rapeseed oil, soybean oil and copra oil; waxes such as toll oil, bees wax, carnauba wax and lanolin; synthetic polymer substances such as petroleum resin, coumaroneindene resin and atactic polypropylene; ester compounds such as dioctyl phthalate, dioctyl adipate and dioctyl sebacate; microcrystalline wax, sub(factice), liquid polybutadiene, modified liquid polybutadiene, liquid thiocol, liquid polyisoprene, liquid polybutene, liquid ethylene-$\alpha$-olefin copolymer and the like. Among them, preferred are paraffinic, naphthenic, and aromatic mineral oils, liquid polyisoprene, liquid polybutene and liquid ethylene-$\alpha$-olefin-based copolymer, and more preferred are liquid polyisoprene, liquid polybutene and liquid ethylene-$\alpha$-olefin-based copolymer.

The content ratio of the above-mentioned softener is preferably from 1 to 200 parts by mass, more preferably from 5 to 100 parts by mass, and particularly preferably from 10 to 50 parts by mass, based on 100 parts by mass of the polyolefin component in component (C). When the content of the softener exceeds 200 parts by mass, the softener may cause poor dispersion in kneading with the rubber and/or the thermoplastic elastomer.

Although not specifically limited, additives in the above-mentioned component (C) include, for example, an aging inhibitor, a weather resistant agent, a UV absorber, a dispersant, a plasticizer, carbon black, an antistatic agent, a surfactant, a tension improver and a flowability improver. Incidentally, the additives in the above-mentioned component (C) may be used either alone or in combination of two or more kinds thereof.

The content ratio of the additive in the above-mentioned component (C) is preferably from 0.01 to 100 parts by mass, more preferably from 0.05 to 50 parts by mass, and particularly preferably from 0.1 to 30 parts by mass, based on 100 parts by mass of the polyolefin component in component (C). An additive content ratio of 0.01 part by mass or more makes it possible to be effective as each additive.

Although not specifically limited, the MFR (230° C.) of the above-mentioned component (C) is, for example, preferably from 3 to 10 g/10 min, and more preferably from 4 to 9 g/10 min. By adjusting the MFR (230° C.) to 3 g/10 min or more and 10 g/10 min or less, formability of the resin composition is improved.

Although not specifically limited, the melt tension (190° C., at break) is, for example, preferably less than 10 cN, and more preferably from 5 to 9.5 cN. By adjusting the melt tension (190° C., at break) to less than 10 cN, extrusion can be smoothly performed.

Although not specifically limited, the JIS hardness A of the above-mentioned component (C) is, for example, preferably from 30 to 90 degrees, and more preferably from 40 to 85 degrees. By adjusting the JIS hardness A to 30 degrees or more, the polyolefin resin foam having a high expansion ratio can be obtained. Further, by adjusting the JIS hardness A to 90 degrees or less, the flexible foam can be obtained. Incidentally, the JIS hardness A used in this specification means the hardness measured based on ISO 7619 (JIS K6253).

Although not specifically limited, the content of polyolefin (A) in the resin composition of the invention is preferably from 10 to 60% by weight, more preferably from 12 to 50% by weight, and still more preferably from 15 to 50% by weight, based on the total weight (100% by weight) of the resin composition of the invention, from the viewpoint that the polyolefin resin foam having a high expansion ratio is obtained.

The content of polyolefin (B) in the resin composition of the invention is from 15 to 75 parts by weight based on 100 parts by weight of polyolefin (A). That is to say, the content of polyolefin (B) based on 100 parts by weight of polyolefin (A) is from 15 to 75 parts by weight. Above all, the content of polyolefin (B) based on 100 parts by weight of polyolefin (A) is preferably from 20 to 70 parts by weight, and more preferably from 25 to 60 parts by weight. When the content of polyolefin (B) is 15 parts by weight or more based on 100 parts by weight of polyolefin (A), cell bloat is hard to occur, and therefore, the polyolefin resin foam having uniform cells is obtained. Further, when the content of polyolefin (B) is 75 parts by weight or less based on 100 parts by weight of polyolefin (A), gas leakage is hard to occur at the time of cell formation, and the polyolefin resin foam having uniform cells is obtained.

Although not specifically limited, the content of component (C) used in the resin composition of the invention as needed is, for example, preferably from 30 to 200 parts by weight, and more preferably from 35 to 180 parts by weight, based on 100 parts by weight of polyolefin (A). When the content of component (C) is 30 parts by weight or more based on 100 parts by weight of polyolefin (A), flexibility and rubber elasticity of the resin composition are improved. Further, when the content of component (C) is 200 parts by weight or less based on 100 parts by weight of polyolefin (A), the polyolefin resin foam having a high expansion ratio is obtained.

Furthermore, although not specifically limited, the content of component (C) in the resin composition of the invention is preferably from 10 to 60% by weight, more preferably from 12 to 50% by weight, and still more preferably from 13 to 50% by weight, based on the total weight (100% by weight) of the resin composition of the invention.

Other additives may be contained in the resin composition of the invention as needed. The type of additive is not specifically limited, and various additives generally used in foam shaping can be used. The above-mentioned additives include, for example, a cell nucleating agent (such as particles described later), a crystal nucleating agent, a plasticizer, a lubricant, a colorant (such as a pigment, a dye or carbon), a UV absorber, an antioxidant, an aging inhibitor, a filler, a reinforcing agent, an antistatic agent, a surfactant, a tension improver, a shrinkage inhibitor, a flowability improver, clay, a vulcanizing agent, a surface treating agent and a flame retardant. The above-mentioned additives may be contained within such a range that the effect of the invention is not impaired. Incidentally, the above-mentioned additives may be used either alone or in combination of two or more kinds thereof.

The cell nucleating agent may be contained in the resin composition of the invention. The above-mentioned cell nucleating agents include, for example, particles. The particles include, for example, talc, silica, alumina, zeolite, calcium carbonate, magnesium carbonate barium sulfate, zinc oxide, titanium oxide, aluminum hydroxide, magnesium hydroxide, mica, clay such as montmorillonite, glass fibers and carbon tubes. Incidentally, the particles may be used either alone or in combination of two or more kinds thereof.

Although the average particle size (particle size) of the above-mentioned particles is not specifically limited, preferred are, for example, particles having an average particle size of 0.1 to 20 μm. When the average particle size of the particles is less than 0.1 μm, the particles may not function as a foam nucleating agent. On the other hand, when the average particle size exceeds 20 μm, it may cause gas leakage at the time of foam shaping.

The above-mentioned cell nucleating agent functions as a cell nucleating agent (foam nucleating agent) at the time of foam shaping of the resin composition, so that when the cell nucleating agent is contained in the resin composition of the invention, the polyolefin resin foam having uniform microcells can be obtained.

Although not specifically limited, the content of the above-mentioned cell nucleating agent is, for example, preferably from 5 to 500 parts by weight, more preferably from 10 to 480 parts by weight, and still more preferably from 15 to 450 parts by weight, based on 100 parts by weight of polyolefin (A) described above. When the content of the cell nucleating agent is 5 parts by weight or more based on 100 parts by weight of polyolefin (A), the function as the cell nucleating agent is exhibited, and the polyolefin resin foam having uniform microcells can be obtained. Further, when the content of the cell nucleating agent is 500 parts by weight or less based on 100 parts by weight of polyolefin (A), an increase in viscosity of the resin composition and gas leakage at the time of form shaping are hard to occur, and the polyolefin resin foam is obtained at a sufficient expansion ratio.

The flame retardant may be contained in the resin composition of the invention. The above-mentioned flame retardant may be either in a powder form or in a form other than the powder form. As the powdery flame retardant, preferred is an inorganic flame retardant. The inorganic flame retardants include, for example, a bromine-based flame retardant, a chlorine-based flame retardant, a phosphorus-based flame retardant, an antimony-based flame retardant, a non-halogen/non-antimony inorganic flame retardant and the like. Here, the bromine-based flame retardant and the chlorine-based flame retardant generate gas components harmful to the human bodies and corrosive to devices at the time of burning, and the phosphorus-based flame retardant and the antimony-based flame retardant involve problems of harmfulness and explosion. Accordingly, as the inorganic flame retardant, preferred is the non-halogen/non-antimony inorganic flame retardant. The non-halogen/non-antimony inorganic flame retardants include, for example, aluminum hydroxide, magnesium hydroxide, hydrated metal compounds such as magnesium oxide/nickel oxide hydrate and magnesium oxide/zinc oxide hydrate, and the like. Incidentally, the hydrated metal oxides may be surface treated. The flame retardants may be used either alone or in combination of two or more kinds thereof.

From the viewpoint that the polyolefin resin foam having flame retardance and a high expansion ratio is obtained, it is preferred that the above-mentioned flame retardant also has a function as the cell nucleating agent. The flame retardants having the function as the cell nucleating agent include, for example, magnesium hydroxide, and aluminum hydroxide.

Although not specifically limited, the content of the above-mentioned flame retardant is, for example, preferably from 10 to 450 parts by weight, more preferably from 20 to 400 parts by weight, still more preferably from 50 to 350 parts by weight, and particularly preferably from 100 to 300 parts by weight, based on 100 parts by weight of polyolefin (A) described above. When the content of the flame retardant is 10 parts by weight or more based on 100 parts by weight of polyolefin (A), the foam after foam shaping becomes flame-retardant, even when the resin composition contains a component having a flammable nature, and can be used for applications requiring flame retardance, such as electric or electronic device applications. Further, when the content of the flame retardant is 450 parts by weight or less based on 100 parts by weight of polyolefin (A), the foam expansion ratio at the time of foam shaping is increased.

The lubricant may be contained in the resin composition of the invention. Although the above-mentioned lubricant is not specifically limited, examples thereof include hydrocarbon-based lubricants such as liquid paraffin, paraffin wax, micro wax and polyethylene wax; fatty acid-based lubricants such as stearic acid, behenic acid and 12-hydroxystearic acid; ester-based lubricants such as butyl stearate, stearic acid monoglyceride, pentaerythritol tetrastearate, hardened castor oil and stearyl stearate; and the like. Incidentally, the lubricants may be used either alone or in combination of two or more kinds thereof.

Although not specifically limited, the content of the above-mentioned lubricant is, for example, preferably from 0.1 to 30 parts by weight, more preferably from 0.5 to 25 parts by weight, and still more preferably from 1 to 20 parts by weight, based on 100 parts by weight of polyolefin (A) described above. When the content of the lubricant is 0.1 part by weight or more based on 100 parts by weight of polyolefin (A), fluidity is improved, and thermal deterioration of the resin composition can be inhibited. When the content of the lubricant is 30 parts by weight or less based on 100 parts by weight of polyolefin (A), fluidity is not excessively increased, and the smooth foam can be obtained.

The resin composition of the invention can be obtained, for example, by kneading and extruding polyolefin (A), polyolefin (B), component (C) optionally added and the other additives optionally added, through a known melt kneading extruder such as a single-screw kneading extruder or a twin-screw kneading extruder. Examples of the shape of the resin composition of the invention include strand, sheet, flat plate and pellet formed by cutting a water-cooled or air-cooled strand into a proper length. Above all, from the viewpoint of productivity, it is preferred that the resin composition is kneaded and pelletized.

The resin composition of the invention is preferably a resin composition for a polyolefin resin foam produced by mixing polyolefin (A) and polyolefin (B) at a ratio of 15 to 75 parts by weight of component (B) to 100 parts by weight of component (A). Above all, the resin composition is preferably a resin composition for a polyolefin resin foam produced by mixing polyolefin (A) at a ratio of 10 to 60% by weight (preferably 12 to 50% by weight) to the total weight (100% by weight) of the resin composition of the invention and polyolefin (B) at a ratio of 15 to 75 parts by weight (preferably 20 to 70 parts by weight and more preferably 25 to 60 parts by weight) to 100 parts by weight of polyolefin (A).

The resin composition of the invention may be a resin composition for a polyolefin resin foam produced by further mixing component (C). Although not specifically limited, the amount of component (C) added is, for example, preferably from 30 to 200 parts by weight, and more preferably from 35 to 180 parts by weight, based on 100 parts by weight of polyolefin (A).

The resin composition of the invention is used as a resin composition in producing the polyolefin resin foam.

[Polyolefin Resin Foam]

The polyolefin resin foam of the invention is formed by foaming (foam shaping) the resin composition of the invention. In this specification, "the polyolefin resin foam of the invention" may be referred to as "the foam of the invention" in some cases.

Although not specifically limited, the apparent density of the foam of the invention is preferably from 0.01 to 0.15 g/cm$^3$, and more preferably from 0.03 to 0.14 g/cm$^3$, from the viewpoint of flexibility or compressibility. Incidentally, the above-mentioned apparent density can be measured by a method described in "(3) Apparent Density" of (Evaluations) described later.

Although not specifically limited, the average cell diameter of the foam of the invention is, for example, preferably from 10 to 200 µm, and more preferably from 30 to 180 µm. When the average cell diameter of the foam is 10 µm or more, impact absorption properties (cushioning properties) are improved. When the average cell diameter of the foam is 200 µm or less, the foam having microcells is obtained. Further, thin layer processing becomes possible, which makes it possible to use the foam in a minute clearance and improves dust-proof properties. Incidentally, the above-mentioned average cell diameter can be measured by a method described in "(5) Average Cell diameter" of (Evaluations) described later.

Although not specifically limited, the cell structure of the foam of the invention is preferably a closed cell structure or a semi-interconnected semi-closed cell structure (in which a closed cell structure and an interconnected cell structure are mixed, and the ratio thereof is not specifically limited), and more preferably a semi-interconnected semi-closed cell structure. Although not specifically limited, the ratio of a closed cell structure moiety in the foam of the invention is preferably 40% or less, and more preferably 30% or less, based on the total volume (100%) of the foam of the invention, from the viewpoint of flexibility. The cell structure can be controlled by adjusting the foam expansion ratio with the amount or the pressure of a foaming agent to be impregnated into the resin composition at the time of foam shaping.

Although not specifically limited, the thickness of the foam of the invention is, for example, preferably from 0.1 to 5 mm, and more preferably from 0.2 to 3 mm. When the thickness is less than 0.1 mm, there is a possibility of causing deterioration of dust-proof properties or cushioning properties. On the other hand, when the thickness exceeds 5 mm, there is a possibility that it becomes difficult to apply the foam to electric or electronic devices having a thin, small or narrow form. Incidentally, the above-mentioned thickness may be adjusted by slicing the foam of the invention after production to a desired thickness.

The relative density (density after foaming/density in unfoamed state (for example, density of the resin composition or density of an unfoamed shaped product) of the foam of the invention is preferably from 0.02 to 0.30, and more preferably from 0.03 to 0.25, from the viewpoint that the thick foam can be formed in a physical foaming method using a gas as the above-mentioned foaming agent. When the relative density exceeds 0.30, foaming becomes insufficient to cause deterioration in flexibility of the foam in some cases. On the other hand, when the relative density is less than 0.02, the strength of the foam may be unfavorably significantly decreased.

The polyolefin resin foam of the invention is formed by foaming the resin composition of the invention. Although not specifically limited, methods for foaming the resin composition include, for example, a physical foaming method (a method of impregnating (dispersing) a low-boiling liquid (foaming agent) into the resin composition, and then vaporizing the foaming agent, thereby forming cells) and a chemical foaming method (a method of generating a gas by thermal degradation of a compound added to the resin composition, thereby forming cells). Above all, a physical foaming method using a high-pressure gas as the foaming agent is preferred, and particularly, preferred is a method of impregnating the resin composition with the high-pressure gas (for example, an inert gas), followed by foaming to form cells.

Although not specifically limited, the above-mentioned foaming agent used in the physical foaming method is preferably a gas, and particularly preferably a gas inactive (an inert gas) to the resin composing the foam of the invention (the resin composing the resin composition of the invention). Although the above-mentioned inert gas is not specifically limited, as long as it is inactive to the resin composing the foam of the invention and capable of being impregnated therein, examples thereof include carbon dioxide, nitrogen gas, air, helium and argon. In particular, as the above-mentioned inert gas, carbon dioxide is preferred in terms of being impregnated into the resin composition in a large amount and at a high speed. Incidentally, the above-mentioned foaming agent may be used either alone or in combination of two or more kinds thereof.

Although not specifically limited, the amount of the above-mentioned foaming agent mixed (contained or impregnated) is, for example, preferably from 2 to 10% by weight based on the total weight (100% by weight) of the resin composition of the invention.

From the viewpoint of increasing the impregnation speed thereof into the resin composition, the above-mentioned inert gas is preferably in a supercritical state at the time of impregnation. In the supercritical state at the time of impregnation, the solubility of the inert gas in the resin composition increases to make possible impregnation (mixing) at a high concentration. Further, since the impregnation at a high concentration is possible, a large number of cell nuclei are developed in rapid pressure reduction after gas impregnation, and the density of cells to be grown from the cell nuclei increases even when the porosity is the same. Accordingly, microcells can be obtained. Incidentally, the critical temperature of carbon dioxide is 31° C., and the critical pressure thereof is 7.4 MPa.

The physical foaming method using the gas as the foaming agent is preferably a method of impregnating the resin composition with the high-pressure gas (for example, the inert gas or the like), followed by foaming through a pressure reduction (for example, to an atmospheric pressure) step (pressure releasing step), thereby forming the foam. Specific examples thereof include a method of impregnating an unfoamed shaped product composed of the resin composition with the high-pressure gas, followed by foaming through the pressure reduction (for example, to an atmospheric pressure) step, thereby forming the foam, and a method of impregnating a melted resin composition with the gas (for example, the inert gas or the like) under a pressurized state, thereafter reducing the pressure (for example, to an atmospheric pressure) for foaming, and subjecting it to shaping, thereby forming the foam.

When the foam of the invention is produced by impregnating the resin composition of the invention with the gas, it may be produced, for example, by a batch process in which the resin composition of the invention is previously shaped into a suitable shape such as a sheet to form an unfoamed shaped resin product (unfoamed shaped product), thereafter this unfoamed shaped resin product is impregnated with the high-pressure gas, and the pressure is released for foaming, or by a continuous process in which the resin composition of the invention is kneaded with the high-pressure gas under pressurized conditions, and the pressure is released simultaneously with shaping to perform shaping and foaming at the same time.

In the above-mentioned batch process, a method for forming the unfoamed shaped resin product is not specifically limited, but examples thereof include a method of shaping the resin composition by using an extruder such as a single-screw extruder or a twin-screw extruder, a method of uniformly kneading the resin composition by using a kneading machine with a blade, such as a roller-type, cam-type, kneader-type or Banbury-type mixer, followed by pressing it with a hot plate press to a predetermined thickness, a method of shaping the resin composition by using an injection molding machine, and the like. Further, although the shape of the unfoamed shaped resin product is not specifically limited, examples thereof include sheet, roll, plate and the like. In the above-mentioned batch process, the resin composition is shaped by an appropriate method by which the unfoamed shaped resin product having a desired shape and thickness is obtained.

In the above-mentioned batch process, cells are formed through a gas impregnation step of putting the unfoamed shaped resin product in a pressure container, injecting (introducing or mixing) a high-pressure gas therein to sufficiently impregnate the unfoamed shaped resin product with the gas, and a pressure reduction step of releasing the pressure (generally to an atmospheric pressure) at the time when sufficiently impregnated with the gas, thereby generating cell nuclei in the resin composition.

On the other hand, in the above-mentioned continuous process, the resin composition is foamed and shaped by a kneading impregnation step of injecting (introducing or mixing) a high-pressure gas while kneading the resin composition by using an extruder (for example, such as a single-screw extruder or a twin-screw extruder) or an injection molding machine, thereby sufficiently impregnating the resin composition with the high-pressure gas, and a shaping pressure reduction step of extruding the resin composition through a die or the like arranged at an end of the extruder, thereby releasing the pressure (generally to an atmospheric pressure) to perform shaping and foaming at the same time.

In the above-mentioned batch process and continuous process, a heating step of allowing the cell nuclei to grow by heating may be provided as needed. Incidentally, the cell nuclei may be allowed to grow at room temperature without providing the heating step. Further, after the cells have been allowed to grow, rapid cooling may be performed with cold water or the like to fix the shape, as needed. The introduction of the high-pressure gas may be performed continuously or discontinuously. Incidentally, although a heating method used in allowing the cell nuclei to grow is not specifically limited, examples thereof include methods using well-known or commonly used means such as a water bath, an oil bath, a hot roll, a hot air oven, far-IR rays, near-IR rays and microwaves.

In the gas impregnation step of the above-mentioned batch process or the kneading impregnation step of the above-mentioned continuous process, the pressure under which the gas is impregnated may be suitably selected in consideration of the type of gas, operability and the like. However, for example, the pressure is preferably 5 MPa or more (for example, from 5 to 100 MPa), and more preferably 7 MPa or more (for example, from 7 to 100 MPa). That is to say, it is preferred to impregnate the resin composition of the invention with the gas under a pressure of 5 MPa or more (for example, a pressure of 5 to 100 MPa), and it is more preferred to impregnate the resin composition with the gas under a pressure of 7 MPa or more (for example, a pressure of 7 to 100 MPa). When the pressure of the gas is lower than 5 MPa, the cells significantly grow and excessively increase in size, unfavorably resulting in a tendency to cause disadvantages such as deterioration of the dust-proof effect. This is because when the pressure is low, the amount of the gas impregnated is relatively small compared to that under a high pressure, and therefore, the cell nuclei-forming speed decreases to decrease the number of the cell nuclei to be formed, so that the gas amount per one cell conversely increases to extremely increase the cell diameter. Further, in the pressure range lower than 5 MPa, the cell diameter and the cell density are largely changed only by a slight change in impregnation pressure, so that it is liable to become difficult to control the cell diameter and the cell density.

Further, the temperature at the time of gas impregnation (impregnation temperature) in the gas impregnation step in the above-mentioned batch process or the kneading impregnation step in the above-mentioned continuous process varies depending on the type of gas or resin used, and can be selected in a wide range. However, in consideration of operability and the like, the temperature is preferably from 10 to 350° C. More specifically, the impregnation temperature in the batch process is preferably from 10 to 250° C., more preferably from 40 to 240° C., and still more preferably from 60 to 230° C. Further, in the continuous process, the impregnation temperature is preferably from 60 to 350° C., more preferably from 100 to 320° C., and still more preferably from 150 to 300° C. Incidentally, when carbon dioxide is used as the high-pressure gas, the temperature at the time of gas impregnation (impregnation temperature) is preferably 32° C. or more (particularly preferably 40° C. or more) in order to keep the supercritical state thereof. Further, after gas impregnation and before foam shaping, the resin composition impregnated with the gas may be cooled to a temperature suitable for foam shaping (for example, from 150 to 190° C.).

Furthermore, in the above-mentioned batch process or the above-mentioned continuous process, the pressure reduction speed in the pressure reduction step (pressure-releasing step) is not specifically limited. However, from the viewpoint that the polyolefin resin foam having uniform microcells is obtained, it is preferably from 5 to 300 MPa/sec.

When the heating step is provided in order to allow the cell nuclei to grow, the heating temperature is, for example, preferably from 40 to 250° C., and more preferably from 60 to 250° C.

When the foam of the invention is formed using the extruder in the continuous process, the discharge speed is, for example, preferably from 50 to 530 kg/cm$^2$·h, and more preferably from 100 to 500 kg/cm$^2$·h. When the foam of the invention has a discharge speed of 50 to 530 kg/cm$^2$·h, the polyolefin resin foam having uniform microcells can be formed. In particular, even when the discharge speed is higher than 300 kg/cm$^2$·h to achieve high production speed, the polyolefin resin foam having uniform microcells can be formed. Accordingly, the polyolefin resin foam having uniform microcells can be efficiently formed, while maintaining a sufficient expansion ratio and flexibility. Incidentally, the discharge speed can be measured by a method described in "(2) Discharge Speed" of (Evaluations) described later.

Incidentally, the cell structure, the density and the relative density of the foam of the invention are controlled by selecting a foaming method or foaming conditions (for example, the type or amount of foaming agent, the temperature, the pressure, the time or the like in foaming) at the time of foam shaping of the resin composition, depending on the type of resin composing the foam of the invention.

The resin composition of the invention contains polyolefin (A) having a low MFR (230° C.) and a high melt tension (190° C., at break), so that foam shaping at a high expansion ratio becomes possible. Accordingly, the thickness of the polyolefin resin foam formed can be increased, and further, the flexibility (strain recovery property or the like) is improved.

Furthermore, the resin composition of the invention contains polyolefin (B) having a relatively high melt tension (190° C., at break), although having a high MFR (230° C.), so that mutual entanglement of molecules is increased. In addition to the above-mentioned characteristics due to containing polyolefin (A), the viscosity of the resin composition is improved by the mutual entanglement of molecules due to containing such polyolefin (B). Accordingly, cell breakage after foam shaping or cell fusion (cell bloat) involved therein is inhibited, thereby being able to form the polyolefin resin foam having uniform microcells.

As described above, the resin composition of the invention contains polyolefin (A) and polyolefin (B), so that foam shaping at a high expansion ratio is possible, and the thickness of the polyolefin resin foam after foam shaping can be increased. Further, the polyolefin resin foam formed has flexibility and uniform microcells. Further, even when the discharge speed is high (the production speed is high), the polyolefin resin foam having uniform microcells can be formed. Accordingly, the production efficiency is improved.

Furthermore, when the resin composition of the invention contain component (C), the flexibility of the resin composition itself is improved, and rubber elasticity is imparted thereto. Accordingly, the flexibility (strain recovery property or the like) of the polyolefin resin foam after foam shaping is improved.

The foam of the invention is favorably used for applications such as dust-proof materials, sealing materials (foamed sealing materials), impact absorbers, acoustic insulators and buffers, which are used in fitting (installing) various members or parts to predetermined sites.

[Foamed Sealing Material]

The foamed sealing material of the invention includes at least the foam of the invention. Further, the foamed sealing material of the invention may be composed of the foam of the invention or may have a structure in which the foam of the invention and a layer other than the foam of the invention (hereinafter occasionally referred to as an "other layer") are laminated with each other. Although not specifically limited, the shape of the foam of the invention is preferably sheet-like (film-like) or tape-like. Further, the foam of the invention may be processed into various shapes depending on its application.

The above-mentioned other layers include, for example, a pressure-sensitive adhesive layer, an intermediate layer (for example, a primer layer for improving adhesion and a substrate layer (for example, a film layer, a nonwoven fabric layer or the like). The other layer may be either a single layer or a laminate composed of a plurality of layers. Further, the other layer(s) may be formed on one surface of the foam of the invention or on both surfaces thereof.

It is preferred that the foamed sealing material of the invention has a structure in which the foam of the invention is laminated with the other layer, particularly a structure in which the foam of the invention is laminated with the pressure-sensitive adhesive layer. For example, when the foamed sealing material of the invention has a sheet-like or tape-like shape, it is preferred to have the pressure-sensitive adhesive layer(s) on one surface side or both surface sides thereof. When the foamed sealing material of the invention has the pressure-sensitive adhesive layer, it is advantageous for fixing or temporary fitting to adherends and advantageous in terms of assembling property. Further, a supporting board can be provided on the foam of the invention through the pressure-sensitive adhesive layer.

Although not specifically limited, pressure-sensitive adhesives forming the above-mentioned pressure-sensitive adhesive layers include, for example, an acrylic pressure-sensitive adhesive, a rubber-based pressure-sensitive adhesive (such as a natural rubber-based pressure-sensitive adhesive or a synthetic rubber-based pressure-sensitive adhesive), a silicone-based pressure-sensitive adhesive, a polyester-based pressure-sensitive adhesive, a urethane-based pressure-sensitive adhesive, a polyamide-based pressure-sensitive adhesive, an epoxy-based pressure-sensitive adhesive, a vinyl alkyl ether-based pressure-sensitive adhesive, a fluorine-based pressure-sensitive adhesive and the like. The above-mentioned pressure-sensitive adhesives may be used either alone or in combination of two or more kinds thereof. The above-mentioned pressure-sensitive adhesives may be of any type of emulsion-based, solvent-based, hot melt type, oligomer-based and solid-based pressure-sensitive adhesives.

Above all, as the above-mentioned pressure-sensitive adhesive, preferred is an acrylic pressure-sensitive adhesive, from the viewpoint of prevention of contamination to adherends. That is to say, it is preferred that the foamed sealing material of the invention has a structure in which the acrylic pressure-sensitive adhesive layer is laminated on the foam of the invention.

Although not specifically limited, the thickness of the above-mentioned pressure-sensitive adhesive layer is preferably from 2 to 100 μm, and more preferably from 10 to 100 μm. It is preferred that the pressure-sensitive adhesive layer is thinner, because the thinner the pressure-sensitive adhesive layer is, the more effectively the adhesion of dust and contaminants to an edge thereof is prevented. Incidentally, the pressure-sensitive adhesive layer may be either a single layer or a laminate.

In the foamed sealing material of the invention, the above-mentioned pressure-sensitive adhesive layer may be formed with the interposition of a layer (underlayer) other than the foam of the invention and the pressure-sensitive adhesive layer. Such underlayers include, for example, a pressure-sensitive adhesive layer other than the above-mentioned pressure-sensitive adhesive layer, an intermediate layer, a primer layer, a substrate layer and the like. Above all, in terms of improving the breaking strength of the foam, the substrate layer is preferred, and particularly, a film layer such as a plastic film layer or a nonwoven fabric layer is preferred.

Although not specifically limited, the foamed sealing material of the invention is used for applications in which various members or parts are fitted (installed) to predetermined sites. In particular, it is preferred that in electric or electronic devices, the foamed sealing material of the invention is suitably used in fitting (installing) parts composing the electric or electronic devices to predetermined sites. That is to say, the foamed sealing material of the invention is preferably a foamed sealing material for electric or electronic devices.

Although not specifically limited, preferred examples of the various materials or parts capable of being fitted (installed) using the foamed sealing material of the invention include various members or parts in electric or electronic devices. Such members or parts for electric or electronic devices include, for example, image display members (display portions) (especially, small-sized image display members) installed to image display devices such as liquid-crystal displays, electroluminescence displays and plasma displays, and optical members or optical parts such as cameras or lenses (especially, small-sized cameras or lenses) installed to mobile communication devices such as so-called "portable telephones" and "portable information terminals".

Preferred specific use modes of the foamed sealing material of the invention include, for example, use thereof around display portions such as LCDs (liquid crystal displays), and use thereof tucked between display portions such as LCDs (liquid crystal displays) and cases (window portions), for the purposes of dust proofing, light shielding, buffering and the like.

EXAMPLES

The invention will be described in more detail below with reference to Examples, but the invention should not be construed as being limited by these Examples. Incidentally, the contents (amounts blended) of respective components in resin compositions of Examples, Comparative Examples and Reference Example are shown in Table 1.

Example 1

As shown in Table 1, 100 parts by weight of polypropylene (trade name: "EA9", manufactured by Japan Polypropylene Corporation, MFR (230° C.): 0.5 g/10 min, melt tension (190° C., at break): 40 cN), 60 parts by weight of polypropylene (trade name: "WB140HMS", manufactured by Borealis Corporation, MFR (230° C.): 2.0 g/10 min, melt tension (190° C., at break): 18 cN), 160 parts by weight of a mixture of a polyolefin-based elastomer and a softener (paraffin-based extender oil), as component (C) (MFR (230° C.): 6 g/10 min, melt tension (190° C., at break): 8.6 cN, JIS hardness A: 79 degrees, the softener was blended in an amount of 30 parts by mass based on 100 parts by mass of the polyolefin-based elastomer), 35 parts by weight of magnesium hydroxide, 35 parts by weight of carbon black (trade name: "Asahi #35", manufactured by Asahi Carbon Co., Ltd.) and 3.5 parts by weight of stearic acid monoglyceride were mixed to prepare a resin composition (I) for a polyolefin resin foam. The content of the polypropylene (trade name: "EA9", manufactured by Japan Polypropylene Corporation, MFR (230° C.): 0.5 g/10 min, melt tension (190° C., at break): 40 cN) was 25% by weight based on the total weight (% by weight) of the resin composition (I) for a polyolefin resin foam. Further, the content of the mixture of the polyolefin-based elastomer and the softener (paraffin-based extender oil), as component (C) (MFR (230° C.): 6 g/10 min, melt tension (190° C., at break): 8.6 cN, JIS hardness A: 79 degrees, the softener was blended in an amount of 30 parts by mass based on 100 parts by mass of the polyolefin-based elastomer) was 41% by weight based on the total weight (% by weight) of the resin composition (I) for a polyolefin resin foam.

The resin composition (I) for a polyolefin resin foam was kneaded in a twin-screw extruder manufactured by The Japan Steel Works Ltd. (JSW), at a temperature of 200° C., then extruded into a strand form, and shaped into a pellet form after cooling. The pellets were put into a single-screw extruder manufactured by The Japan Steel Works Ltd. (JSW), and carbon dioxide gas was injected (impregnated) into the pellets at a pressure of 13 MPa under an atmosphere of 220° C. The carbon dioxide gas was injected at a ratio of 5.6 parts by weight to the total amount (100 parts by weight) of the polypropylene and the mixture of the polyolefin-based elastomer and the softener contained in the resin composition for a polyolefin resin foam. The carbon dioxide gas at the time of impregnation was in a supercritical state. The pressure thereof after injection was 12 MPa. After sufficient saturation with the carbon dioxide gas, the resin composition was cooled to 180° C., and then, extruded through a die at a discharge speed of 480 kg/cm$^2$·h to obtain a polyolefin resin foam.

Example 2

As shown in Table 1, 100 parts by weight of polypropylene (trade name: "E110G", manufactured by Prime Polymer Co., Ltd., MFR (230° C.): 0.3 g/10 min, melt tension (190° C., at break): 57 cN), 60 parts by weight of polypropylene (trade name: "WB140HMS", manufactured by Borealis Corporation, MFR (230° C.): 2.0 g/10 min, melt tension (190° C., at break): 18 cN), 160 parts by weight of a mixture of a polyolefin-based elastomer and a softener (paraffin-based extender oil), as component (C) (MFR (230° C.): 6 g/10 min, melt tension (190° C., at break): 8.6 cN, JIS hardness A: 79 degrees, the softener was blended in an amount of 30 parts by mass based on 100 parts by mass of the polyolefin-based elastomer), 35 parts by weight of magnesium hydroxide, 35 parts by weight of carbon black (trade name: "Asahi #35", manufactured by Asahi Carbon Co., Ltd.) and 3.5 parts by weight of stearic acid monoglyceride were mixed to prepare a resin composition (II) for a polyolefin resin foam.

Using the resin composition (II) for a polyolefin resin foam, a polyolefin resin foam was obtained in the same manner as in Example 1.

Example 3

As shown in Table 1, 100 parts by weight of polypropylene (trade name: "EA9FT", manufactured by Japan Polypropylene Corporation, MFR (230° C.): 0.4 g/10 min, melt tension (190° C., at break): 47 cN), 60 parts by weight of polypropylene (trade name: "WB140HMS", manufactured by Borealis Corporation, MFR (230° C.): 2.0 g/10 min, melt tension (190° C., at break): 18 cN), 160 parts by weight of a mixture of a polyolefin-based elastomer and a softener (paraffin-based extender oil), as component (C) (MFR (230° C.): 6 g/10 min, melt tension (190° C., at break): 8.6 cN, JIS hardness A: 79 degrees, the softener was blended in an amount of 30 parts by mass based on 100 parts by mass of the polyolefin-based elastomer), 35 parts by weight of magnesium hydroxide, 35 parts by weight of carbon black (trade name: "Asahi #35", manufactured by Asahi Carbon Co., Ltd.) and 3.5 parts by weight of stearic acid monoglyceride were mixed to prepare a resin composition (III) for a polyolefin resin foam.

Using the resin composition (III) for a polyolefin resin foam, a polyolefin resin foam was obtained in the same manner as in Example 1.

Example 4

As shown in Table 1, 100 parts by weight of polypropylene (trade name: "EA9FT", manufactured by Japan Polypropylene Corporation, MFR (230° C.): 0.4 g/10 min, melt tension (190° C., at break): 47 cN), 60 parts by weight of polypropylene (trade name: "WB135HMS", manufactured by Borealis Corporation, MFR (230° C.): 2.4 g/10 min, melt tension (190° C., at break): 14 cN), 160 parts by weight of a mixture of a polyolefin-based elastomer and a softener (paraffin-based extender oil), as component (C) (MFR (230° C.): 6 g/10 min, melt tension (190° C., at break): 8.6 cN, JIS hardness A: 79 degrees, the softener was blended in an amount of 30 parts by mass based on 100 parts by mass of the polyolefin-based elastomer), 35 parts by weight of magnesium hydroxide, 35 parts by weight of carbon black (trade name: "Asahi #35", manufactured by Asahi Carbon Co., Ltd.) and 3.5 parts by weight of stearic acid monoglyceride were mixed to prepare a resin composition (IV) for a polyolefin resin foam.

Using the resin composition (IV) for a polyolefin resin foam, a polyolefin resin foam was obtained in the same manner as in Example 1.

Example 5

As shown in Table 1, 100 parts by weight of polypropylene (trade name: "EA9", manufactured by Japan Polypropylene Corporation, MFR (230° C.): 0.5 g/10 min, melt tension (190° C., at break): 40 cN), 25 parts by weight of polypropylene (trade name: "WB140HMS", manufactured by Borealis Corporation, MFR (230° C.): 2.0 g/10 min, melt tension (190° C., at break): 18 cN), 125 parts by weight of a mixture of a polyolefin-based elastomer and a softener (paraffin-based extender oil), as component (C) (MFR (230° C.): 6 g/10 min, melt tension (190° C., at break): 8.6 cN, JIS hardness A: 79 degrees, the softener was blended in an amount of 30 parts by mass based on 100 parts by mass of the polyolefin-based elastomer), 28 parts by weight of magnesium hydroxide, 28 parts by weight of carbon black (trade name: "Asahi #35", manufactured by Asahi Carbon Co., Ltd.) and 2.8 parts by weight of stearic acid monoglyceride were mixed to prepare a resin composition (V) for a polyolefin resin foam.

Using the resin composition (V) for a polyolefin resin foam, a polyolefin resin foam was obtained in the same manner as in Example 1.

Example 6

As shown in Table 1, 100 parts by weight of polypropylene (trade name: "EA9", manufactured by Japan Polypropylene Corporation, MFR (230° C.): 0.5 g/10 min, melt tension (190° C., at break): 40 cN), 60 parts by weight of polypropylene (trade name: "WB135HMS", manufactured by Borealis Corporation, MFR (230° C.): 2.4 g/10 min, melt tension (190° C., at break): 14 cN), 70 parts by weight of a mixture of a polyolefin-based elastomer and a softener (paraffin-based extender oil), as component (C) (MFR (230° C.): 6 g/10 min, melt tension (190° C., at break): 8.6 cN, JIS hardness A: 79 degrees, the softener was blended in an amount of 30 parts by mass based on 100 parts by mass of the polyolefin-based elastomer), 300 parts by weight of magnesium hydroxide, 15 parts by weight of carbon black (trade name: "Asahi #35", manufactured by Asahi Carbon Co., Ltd.) and 2.3 parts by weight of stearic acid monoglyceride were mixed to prepare a resin composition (XI) for a polyolefin resin foam.

Using the resin composition (XI) for a polyolefin resin foam, a polyolefin resin foam was obtained in the same manner as in Example 1.

Comparative Example 1

As shown in Table 1, 100 parts by weight of polypropylene (trade name: "EA9", manufactured by Japan Polypropylene Corporation, MFR (230° C.): 0.5 g/10 min, melt tension (190° C., at break): 40 cN), 100 parts by weight of a mixture of a polyolefin-based elastomer and a softener (paraffin-based extender oil), as component (C) (MFR (230° C.): 6 g/10 min, melt tension (190° C., at break): 8.6 cN, JIS hardness A: 79 degrees, the softener was blended in an amount of 30 parts by mass based on 100 parts by mass of the polyolefin-based elastomer), 22 parts by weight of magnesium hydroxide, 22 parts by weight of carbon black (trade name: "Asahi #35", manufactured by Asahi Carbon Co., Ltd.) and 2.2 parts by weight of stearic acid monoglyceride were mixed to prepare a resin composition (VI) for a polyolefin resin foam.

Using the resin composition (VI) for a polyolefin resin foam, a polyolefin resin foam was obtained in the same manner as in Example 1.

Reference Example

A polyolefin resin foam was obtained in the same manner as in Comparative Example 1 with the exception that the discharge speed was changed to 290 kg/cm$^2$·h.

Comparative Example 2

As shown in Table 1, 100 parts by weight of polypropylene (trade name: "EA9", manufactured by Japan Polypropylene Corporation, MFR (230° C.): 0.5 g/10 min, melt tension (190° C., at break): 40 cN), 60 parts by weight of polypropylene (trade name: "FY6", manufactured by Japan Polypropylene Corporation, MFR (230° C.): 2.4 g/10 min, melt tension (190° C., at break): 9 cN), 160 parts by weight of a mixture of a polyolefin-based elastomer and a softener (paraffin-based extender oil), as component (C) (MFR (230° C.): 6 g/10 min, melt tension (190° C., at break): 8.6 cN, JIS hardness A: 79 degrees, the softener was blended in an amount of 30 parts by mass based on 100 parts by mass of the polyolefin-based elastomer), 35 parts by weight of magnesium hydroxide, 35 parts by weight of carbon black (trade name: "Asahi #35", manufactured by Asahi Carbon Co., Ltd.) and 3.5 parts by weight of stearic acid monoglyceride were mixed to prepare a resin composition (VII) for a polyolefin resin foam.

Using the resin composition (VII) for a polyolefin resin foam, a polyolefin resin foam was obtained in the same manner as in Example 1.

Comparative Example 3

As shown in Table 1, 100 parts by weight of polypropylene (trade name: "EA9FT", manufactured by Japan Polypropylene Corporation, MFR (230° C.): 0.4 g/10 min, melt tension (190° C., at break): 47 cN), 60 parts by weight of polypropylene (trade name: "PF380A", manufactured by Sun Aroma Co., Ltd., MFR (230° C.): 1.2 g/10 min, melt tension (190° C., at break): 13 cN), 160 parts by weight of a mixture of a polyolefin-based elastomer and a softener (paraffin-based extender oil), as component (C) (MFR (230° C.): 6 g/10 min, melt tension (190° C., at break): 8.6 cN, JIS hardness A: 79 degrees, the softener was blended in an amount of 30 parts by mass based on 100 parts by mass of the polyolefin-based elastomer), 35 parts by weight of magnesium hydroxide, 35 parts by weight of carbon black (trade name: "Asahi #35", manufactured by Asahi Carbon Co., Ltd.) and 3.5 parts by weight of stearic acid monoglyceride were mixed to prepare a resin composition (VIII) for a polyolefin resin foam.

Using the resin composition (VIII) for a polyolefin resin foam, a polyolefin resin foam was obtained in the same manner as in Example 1.

Comparative Example 4

As shown in Table 1, 100 parts by weight of polypropylene (trade name: "EA9", manufactured by Japan Polypropylene Corporation, MFR (230° C.): 0.5 g/10 min, melt tension (190° C., at break): 40 cN), 10 parts by weight of polypropylene (trade name: "WB140HMS", manufactured by Borealis Corporation, MFR (230° C.): 2.0 g/10 min, melt tension (190° C., at break): 18 cN)), 110 parts by weight of a mixture of a polyolefin-based elastomer and a softener (paraffin-based extender oil), as component (C) (MFR (230° C.): 6 g/10 min, melt tension (190° C., at break): 8.6 cN, JIS hardness A: 79 degrees, the softener was blended in an amount of 30 parts by mass based on 100 parts by mass of the polyolefin-based elastomer), 24 parts by weight of magnesium hydroxide, 24 parts by weight of carbon black (trade name: "Asahi #35", manufactured by Asahi Carbon Co., Ltd.) and 2.4 parts by weight of stearic acid monoglyceride were mixed to prepare a resin composition (IX) for a polyolefin resin foam.

Using the resin composition (IX) for a polyolefin resin foam, a polyolefin resin foam was obtained in the same manner as in Example 1.

Comparative Example 5

As shown in Table 1, 100 parts by weight of polypropylene (trade name: "EA9", manufactured by Japan Polypropylene Corporation, MFR (230° C.): 0.5 g/10 min, melt tension (190° C., at break): 40 cN), 80 parts by weight of polypropylene (trade name: "WB140HMS", manufactured by Borealis Corporation, MFR (230° C.): 2.0 g/10 min, melt tension (190° C., at break): 18 cN)), 180 parts by weight of a mixture of a polyolefin-based elastomer and a softener (paraffin-based extender oil), as component (C) (MFR (230° C.): 6 g/10 min, melt tension (190° C., at break): 8.6 cN, JIS hardness A: 79 degrees, the softener was blended in an amount of 30 parts by mass based on 100 parts by mass of the polyolefin-based elastomer), 40 parts by weight of magnesium hydroxide, 40 parts by weight of carbon black (trade name: "Asahi #35", manufactured by Asahi Carbon Co., Ltd.) and 4.0 parts by weight of stearic acid monoglyceride were mixed to prepare a resin composition (X) for a polyolefin resin foam.

Using the resin composition (X) for a polyolefin resin foam, a polyolefin resin foam was obtained in the same manner as in Example 1.

(Evaluations)

The following evaluations were made for the polyolefins and the mixture of the olefin-based elastomer and the softener used as the raw materials in Examples, Reference Example and Comparative Examples, and the polyolefin resin foams obtained in Examples, Reference Example and Comparative Examples. The results thereof are shown in Table 1.

(1) Melt Tension (190° C., at Break)

Using a twin-capillary rheometer "type RH7-2" (manufactured by Rothand Precision), each of the polyolefins and the mixture of the olefin-based elastomer and the softener used as the raw materials in Examples, Reference Example and Comparative Examples was extruded into a melt strand form at an extrusion speed of 8.8 mm/min under conditions of a heating temperature of 190° C. and an orifice diameter of 1 mm, and the strand was taken over at a take-over speed of 0.5 m/min. The take-over speed was increased by 0.1 m/min, and the melt tension at the time when the strand-shaped polyolefin or mixture of the olefin-based elastomer and the softener was broken was taken as the "melt tension (190° C., at break)".

(2) Discharge Speed

The polyolefin resin foam extruded from the die was collected for 36 seconds, and the weight thereof was measured and taken as the discharge amount (kg). The discharge speed was calculated from the discharge amount (kg), the discharge time (h (hour)) and the die size (die opening area) ($cm^2$), using the following equation:

$$\text{Discharge speed } (kg/cm^2 \cdot h) = \text{discharge amount } (kg) / (\text{die size } (cm^2) \times \text{discharge time } (h))$$

(3) Apparent Density

Each of the polyolefin resin foams obtained in Examples, Reference Example and Comparative Examples was punched out with a punching blade of 40 mm wide by 40 mm long to form a measuring sample (a). The width and length of the measuring sample (a) were measured, and the thickness (mm) of the measuring sample (a) was measured with a 1/100 dial gauge with a measuring terminal having a diameter of 20 mm. From these values, the volume of the polyolefin resin foam was calculated.

Then, the weight of the measuring sample (a) was measured with an even balance having a minimum scale value of 0.01 g or more. From the above-mentioned measured volume and weight, the apparent density ($g/cm^3$) of the polyolefin resin foam was calculated.

(4) Flexibility

Each of the polyolefin resin foams obtained in Examples, Reference Example and Comparative Examples was punched out to a size of 100 mm wide by 100 mm long to form a measuring sample (b). At the time when the measuring sample (b) was compressed to 50% of the thickness thereof before compression, the compression load ($N/cm^2$) was measured. A case where the compression load was 3 $N/cm^2$ or less was evaluated as "good in flexibility (A)", and a case where the compression load was more than 3 $N/cm^2$ was evaluated as "poor in flexibility (B)".

(5) Average Cell Diameter

Each of the polyolefin resin foams obtained in Examples, Reference Example and Comparative Examples was cut in a thickness direction thereof, and an image of a cross section (cross section in the thickness direction) enlarged at a magnification of X100 was scanned by a digital microscope (trade name: "VH-8000" manufactured by Keyence Corporation). Image analysis was performed by using an image analysis software (trade name: "Win ROOF" manufactured by Mitani Corporation), thereby measuring the cell diameter of all cells observed in the cross section to determine the average cell diameter (μm) of the polyolefin resin foam.

Figure 2:
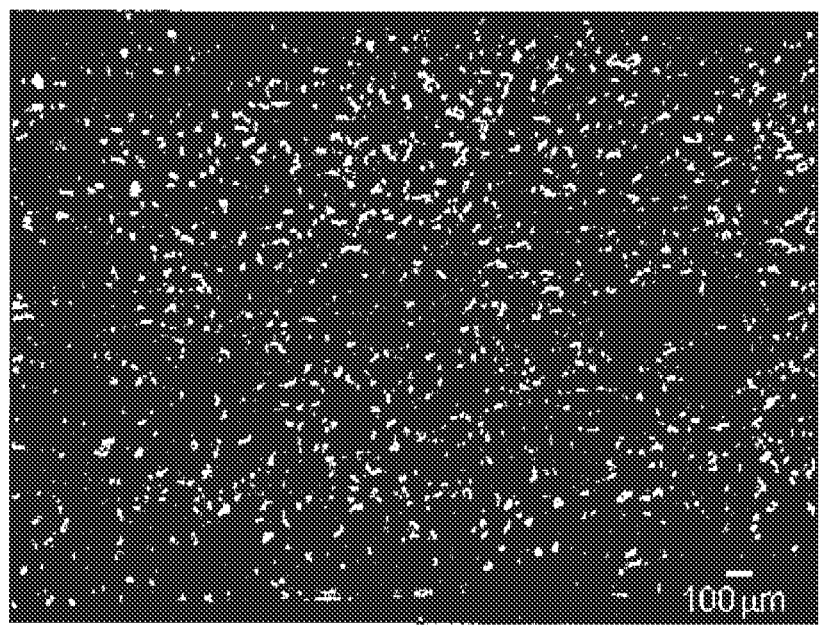
FIG. 2 is a digital microscope photograph showing a cross section in a thickness direction of a polyolefin resin foam of Comparative Example 1.

Incidentally, FIG. 1 shows an enlarged image of a cross section in a thickness direction of the polyolefin resin foam of Example 1 scanned by the above-mentioned method. FIG. 2 shows an enlarged image of a cross section in a thickness direction of the polyolefin resin foam of Comparative Example 1 scanned by the above-mentioned method. In Example 1, the average cell diameter was determined by measuring the cell diameter of all cells observed in the image of FIG. 1.

(6) Cell Uniformity

Each of the polyolefin resin foams obtained in Examples, Reference Example and Comparative Examples was cut in a thickness direction thereof, and an image of a cross section (cross section in the thickness direction) enlarged at a magnification of X100 was scanned by a digital microscope (trade name: "VH-8000" manufactured by Keyence Corporation). Image analysis was performed by using an image analysis software (trade name: "Win ROOF" manufactured by Mitani Corporation), thereby measuring the cell diameter of all cells observed in the cross section to determine "the average cell diameter (μm) in the cross section in the thickness direction".

In a case where a cell having a diameter of 3 times or more the average cell diameter in the cross section in the thickness direction was not observed in the cross section in the thickness direction of the polyolefin resin foam, the cell uniformity was judged as "uniform (A)".

In a case where a cell having a diameter of 3 times or more the average cell diameter in the cross section in the thickness direction was observed in the cross section in the thickness direction of the polyolefin resin foam, the cell uniformity was judged as "uneven (B)".

uniform in size between the surface portion and the center portion. Further, in the polyolefin resin foam formed from the resin composition containing the polyolefin (FY60) having a high MFR (230° C.) and a low melt tension (190° C., at break), the cells were uneven, and moreover, the average cell diameter was large (Comparative Example 2). The polyolefin resin foam excellent in flexibility and having uniform microcells was also formed from the resin composition containing no polyolefin (B) by decreasing the discharge speed in forming the polyolefin resin foam (Reference Example). However, when the discharge speed was increased, the cells became uneven (Comparative Example 1).

TABLE 1

|  |  | Example 1 | Example 2 | Example 3 | Example 4 | Example 5 | Example 6 |
|---|---|---|---|---|---|---|---|
| Polyolefin (A) | E110G |  | 100 |  |  |  |  |
| (parts by weight) | EA9 | 100 |  |  |  | 100 | 100 |
|  | EA9FT |  |  | 100 | 100 |  |  |
| Polyolefin (B) | WB140HMS | 60 | 60 | 60 |  | 25 |  |
| (parts by weight) | WB135HMS |  |  |  | 60 |  | 60 |
| Other Polyolefin | FY6 |  |  |  |  |  |  |
| (parts by weight) | PF380A |  |  |  |  |  |  |
| Component (C) (parts by weight) |  | 160 | 160 | 160 | 160 | 125 | 70 |
| Magnesium hydroxide (parts by weight) |  | 35 | 35 | 35 | 35 | 28 | 300 |
| Carbon Black (parts by weight) |  | 35 | 35 | 35 | 35 | 28 | 15 |
| Stearic Acid Monoglyceride (parts by weight) |  | 3.5 | 3.5 | 3.5 | 3.5 | 2.8 | 2.3 |
| Content of Polyolefin (A) Based on Total Weight (100% by weight) of Resin Composition (% by weight) |  | 25 | 25 | 25 | 25 | 32 | 18 |
| Content of Component (C) Based on Total Weight (100% by weight) of Resin Composition (% by weight) |  | 41 | 41 | 41 | 41 | 41 | 13 |
| Discharge Speed (kg/cm² · h) |  | 480 | 480 | 480 | 480 | 480 | 500 |
| Apparent Density (g/cm³) |  | 0.042 | 0.035 | 0.038 | 0.043 | 0.037 | 0.103 |
| Flexibility |  | A | A | A | A | A | A |
| Average Cell Diameter (μm) |  | 69 | 85 | 95 | 60 | 105 | 95 |
| Cell Uniformity |  | A | A | A | A | A | A |

|  |  | Comp. Ex. 1 | Comp. Ex. 2 | Comp. Ex. 3 | Comp. Ex. 4 | Comp. Ex. 5 | Reference Example |
|---|---|---|---|---|---|---|---|
| Polyolefin (A) | E110G |  |  |  |  |  |  |
| (parts by weight) | EA9 | 100 | 100 |  | 100 | 100 | 100 |
|  | EA9FT |  |  | 100 |  |  |  |
| Polyolefin (B) | WB140HMS |  |  |  | 10 | 80 |  |
| (parts by weight) | WB135HMS |  |  |  |  |  |  |
| Other Polyolefin | FY6 |  | 60 |  |  |  |  |
| (parts by weight) | PF380A |  |  | 60 |  |  |  |
| Component (C) (parts by weight) |  | 100 | 160 | 160 | 110 | 180 | 100 |
| Magnesium hydroxide (parts by weight) |  | 22 | 35 | 35 | 24 | 40 | 22 |
| Carbon Black (parts by weight) |  | 22 | 35 | 35 | 24 | 40 | 22 |
| Stearic Acid Monoglyceride (parts by weight) |  | 2.2 | 3.5 | 3.5 | 2.4 | 4.0 | 2.2 |
| Content of Polyolefin (A) Based on Total Weight (100% by weight) of Resin Composition (% by weight) |  | 41 | 25 | 25 | 37 | 23 | 41 |
| Content of Component (C) Based on Total Weight (100% by weight) of Resin Composition (% by weight) |  | 41 | 41 | 41 | 41 | 41 | 41 |
| Discharge Speed (kg/cm² · h) |  | 480 | 480 | 480 | 480 | 480 | 290 |
| Apparent Density (g/cm³) |  | 0.040 | 0.039 | 0.044 | 0.035 | 0.055 | 0.033 |
| Flexibility |  | A | A | A | A | A | A |
| Average Cell Diameter (μm) |  | 90 | 210 | 65 | 115 | 40 | 92 |
| Cell Uniformity |  | B | B | B | B | B | A |

As known from the evaluation results (Table 1), the polyolefin resin foams of the invention were excellent in flexibility and had uniform microcells (Examples 1 to 6). As known from FIG. 1, in the polyolefin resin foam of Example 1, the uniform microcells were obtained over the whole cross section in the thickness direction.

On the other hand, in the polyolefin resin foams formed from the resin compositions containing no polyolefin (B), no uniform cells were obtained (Comparative Examples 1 to 3). As known from FIG. 2, the polyolefin resin foam of Comparative Example 1 had microcells in a surface portion of the cross section in the thickness direction, but had relatively large cells in a center portion thereof, and the cells were not Further, also in the polyolefin resin foams formed from the resin compositions having polyolefin (B) contents of less than 15 parts by weight or more than 75 parts by weight, based on 100 parts by weight of polyolefin (A), the cells were uneven (Comparative Examples 4 and 5).

While the invention has been described in detail with reference to specific embodiments thereof, it will be apparent to one skilled in the art that various changes and modifications can be made therein without departing from the spirit and scope thereof.

Incidentally, the present application is based on Japanese Patent Applications No. 2011-167427 filed on Jul. 29, 2011 and No. 2012-103118 filed on Apr. 27, 2012, and the contents are incorporated herein by reference.

All references cited herein are incorporated by reference herein in their entirety.

What is claimed is:

1. A resin composition for a polyolefin resin foam, comprising:
   a polyolefin (A) having a melt flow rate (MFR) at a temperature of 230° C. of 0.2 to 0.7 g/10 min and a melt tension at break measured at a temperature of 190° C. of 30 cN or more;
   a polyolefin (B) having a melt flow rate (MFR) at a temperature of 230° C. of 1.5 to 10 g/10 min and a melt tension at break measured at a temperature of 190° C. of 10 cN or more,
   wherein the polyolefin (B) is contained in an amount of from 15 to 75 parts by weight based on 100 parts by weight of the polyolefin (A); and
   a component (C) comprising a softener and at least one selected from the group consisting of a rubber and a thermoplastic elastomer, wherein the component (C) has a melt flow rate (MFR) at a temperature of 230° C. of 3 to 10 g/10 min and a melt tension at break measured at a temperature of 190° C. of less than 10 cN,
   wherein the component (C) is contained in an amount of from 30 to 200 parts by weight based on 100 parts by weight of the polyolefin (A), and
   wherein the softener is contained in an amount of from 1 to 200 parts by mass based on 100 parts by mass of a polyolefin component of component (C).

2. A polyolefin resin foam formed by foaming the resin composition for a polyolefin resin foam according to claim 1.

3. The polyolefin resin foam according to claim 2, having an apparent density of 0.01 to 0.15 g/cm$^3$.

4. The polyolefin resin foam according to claim 2, having an average cell diameter of 10 to 200 μm.

5. The polyolefin resin foam according to claim 2, which is formed by impregnating the resin composition for a polyolefin resin foam with an inert gas under a pressure of 5 MPa or more, followed by foaming.

6. The polyolefin resin foam according to claim 5, wherein the inert gas is carbon dioxide.

7. The polyolefin resin foam according to claim 5, wherein the inert gas at the time of impregnation is in a supercritical state.

8. The polyolefin resin foam according to claim 2, having a semi-interconnected semi-closed cell structure.

9. A foamed sealing material comprising the polyolefin resin foam according to claim 2.

10. The foamed sealing material according to claim 9, further comprising a pressure-sensitive adhesive layer.

* * * * *